US009640052B2

(12) United States Patent
Lee

(10) Patent No.: US 9,640,052 B2
(45) Date of Patent: May 2, 2017

(54) HOME INTELLECTUAL POSITIONING SYSTEM

(71) Applicant: Wen-Sung Lee, Taichung (TW)

(72) Inventor: Wen-Sung Lee, Taichung (TW)

( * ) Notice: Subject to any disclaimer, the term of this patent is extended or adjusted under 35 U.S.C. 154(b) by 522 days.

(21) Appl. No.: 14/261,438

(22) Filed: Apr. 25, 2014

(65) Prior Publication Data

US 2015/0310288 A1 Oct. 29, 2015

(51) Int. Cl.

*G01K 13/00* (2006.01)
*G01N 25/00* (2006.01)
*G01K 11/22* (2006.01)
*G08B 13/181* (2006.01)
*G08B 13/16* (2006.01)

(52) U.S. Cl.

CPC ....... *G08B 13/181* (2013.01); *G08B 13/1645* (2013.01)

(58) Field of Classification Search

USPC .......... 374/117, 142, 45
See application file for complete search history.

(56) References Cited

U.S. PATENT DOCUMENTS 5,382,943 A * 1/1995 Tanaka ............ G08B 13/19619 340/500
5,726,449 A * 3/1998 Yoshiike ............ G08B 13/1645 250/338.3
5,877,688 A * 3/1999 Morinaka ............ G01S 7/4813 250/338.1
5,986,357 A * 11/1999 Myron ............ G06K 9/00335 307/116
6,081,193 A * 6/2000 Trucchi ............ G08B 29/16 340/538
7,541,923 B2 * 6/2009 Chien ............ G08B 13/1618 340/500
7,986,231 B1 * 7/2011 Bentley ............ G08B 13/1672 340/540
8,184,004 B2 * 5/2012 Roosli ............ G08B 21/0469 340/541
2003/0112139 A1 * 6/2003 Matsui ............ G01V 8/10 340/500
2008/0079569 A1 * 4/2008 Axelsen ............ G06Q 10/10 340/541
2009/0153326 A1 * 6/2009 Doumi ............ G08B 13/2491 340/541
2010/0102962 A1 * 4/2010 Hick ............ H05B 37/0227 340/541

(Continued)

*Primary Examiner* — Mirellys Jagan
(74) *Attorney, Agent, or Firm* — Rosenberg, Klein & Lee

(57) ABSTRACT

A home intellectual positioning system for use in a house, the system includes a power supply, a sound sensor, a thermal sensor, an identification unit and an intellectual processor. The sound sensor is provided for detecting and tracking a sonic wave of a home member to generate a sonic wave value. The thermal sensor is provided for detecting and tracking a body temperature of the home member to generate a body temperature value. The identification unit is provided for storing sonic wave information and body temperature information of a plurality of home members. The intellectual processor is interconnected to the identification unit, and to compare the sonic wave value of the sound sensor with the sonic wave information and the body temperature value of the thermal sensor with the body temperature information to identify which home member stays in the house.

6 Claims, 5 Drawing Sheets

(56) References Cited

U.S. PATENT DOCUMENTS

| | | | | |
|---|---|---|---|---|
| 2015/0106061 | A1* | 4/2015 | Yang | G08C 17/00 702/188 |
| 2015/0300892 | A1* | 10/2015 | Malhotra | G01K 13/00 700/276 |
| 2015/0319553 | A1* | 11/2015 | Grumbles, III | G06Q 50/12 702/188 |

* cited by examiner

HOME INTELLECTUAL POSITIONING SYSTEM

BACKGROUND OF THE INVENTION

1. Field of the Invention

The present invention relates to a positioning system, and more particularly to a home intellectual positioning system.

2. Description of Related Art

Position tracking systems are used in a wide variety of applications such as home positioning system provided for tracking persons in the house. However, signals of position sensors may be interfered by barriers easily. In addition, the identification of persons may be insufficient by merely one type of position sensors.

A conventional home positioning system comprises a plurality of transmitters disposed in objects with different codes. A plurality of signal receivers disposed at a ceiling. Every four of signal receivers define a square receiving grid. A processing module calculates signals from the signal receivers and takes three highest signals of four signal receivers to define a triangular area so as to simply define the position of the object.

Nevertheless, the conventional home positioning system is unable to identify ID information of persons.

The present invention has arisen to mitigate and/or obviate the disadvantages of the conventional home positioning system.

SUMMARY OF THE INVENTION

The main objective of the present invention is to provide an improved home positioning system.

To achieve the objective, a home intellectual positioning system for use in a house, the system includes a power supply, a sound sensor, a thermal sensor, an identification unit and an intellectual processor. The sound sensor is provided for detecting and tracking a sonic wave of a home member to generate a sonic wave value. The thermal sensor is provided for detecting and tracking a body temperature of the home member to generate a body temperature value. The identification unit is provided for storing sonic wave information and body temperature information of a plurality of home members. The intellectual processor is interconnected to the identification unit, and to compare the sonic wave value of the sound sensor with the sonic wave information of the identification unit and the body temperature value of the thermal sensor with the body temperature information of the identification unit to identify which home member stays in the house.

Preferably, the identification unit further stores ID information of each home member such as name, sex, age, height, body conformation, medical record. Also, the identification unit further stores environmental information which is renewable, wherein the environmental information includes indoor temperature.

Preferably, the sonic wave information includes sounds of voice and sounds of walking step; and the body temperature information includes day and night body temperature information and body temperature information in various seasons.

Further benefits and advantages of the present invention will become apparent after a careful reading of the detailed description with appropriate reference to the accompanying drawings.

DETAILED DESCRIPTION OF THE INVENTION

Figure 1:
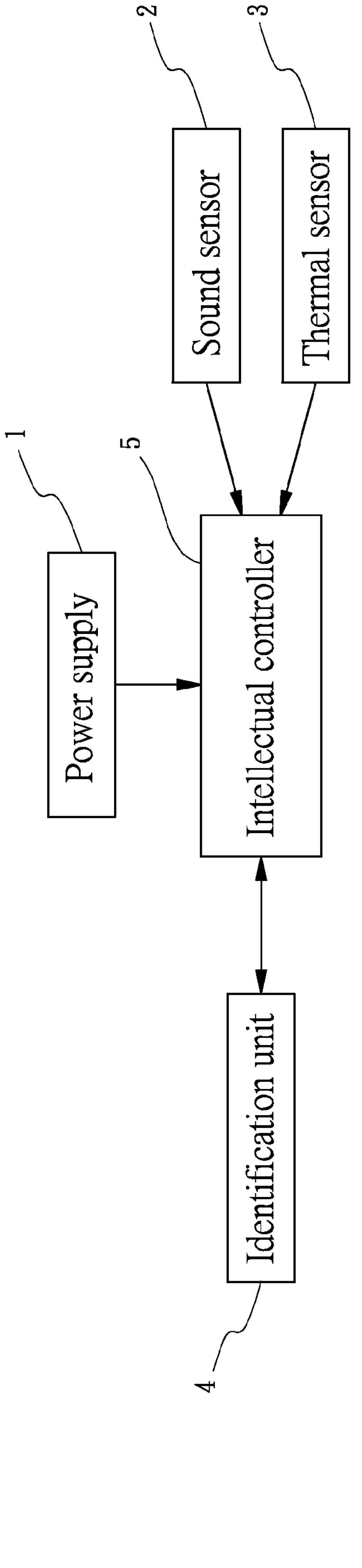
FIG. 1 is a block diagram of the home intellectual positioning system of the present invention.
Figure 2:
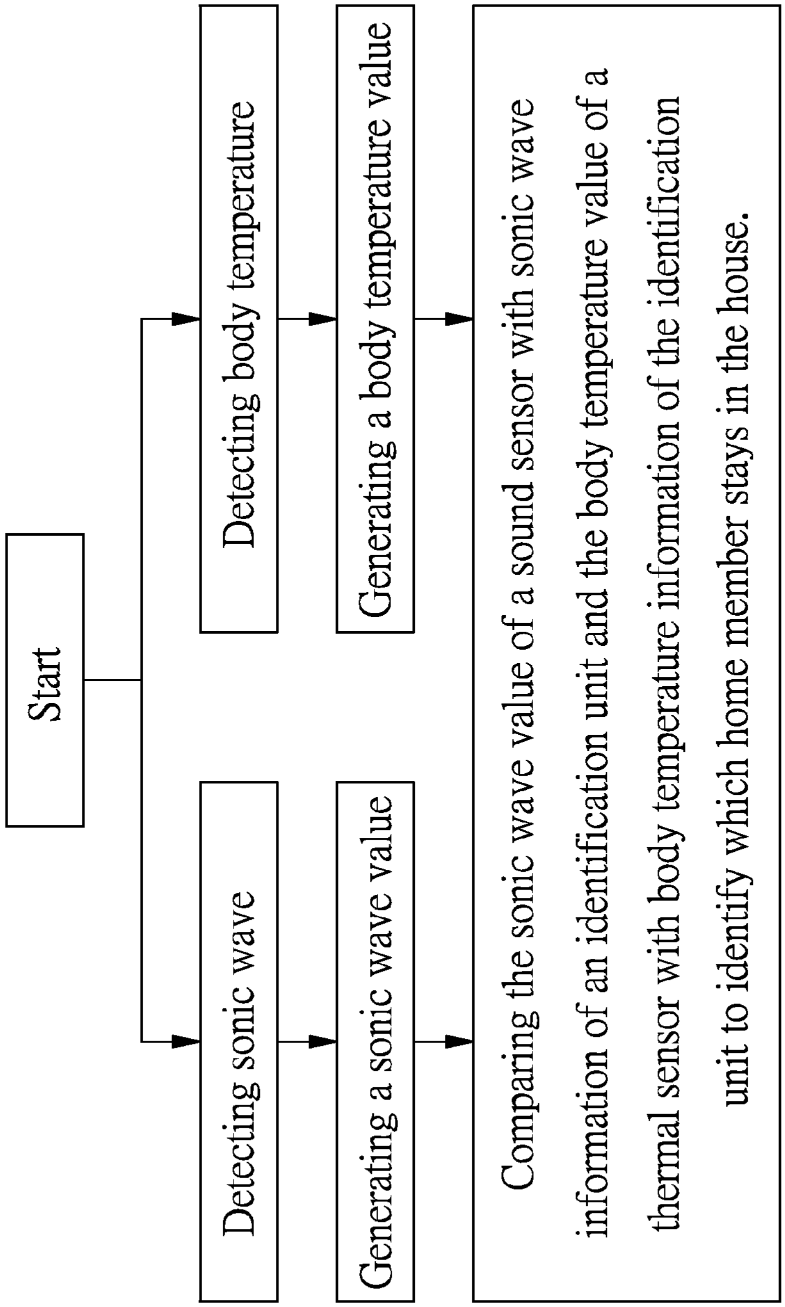
FIG. 2 is a flow chart of the home intellectual positioning system of the present invention.
Figure 3:
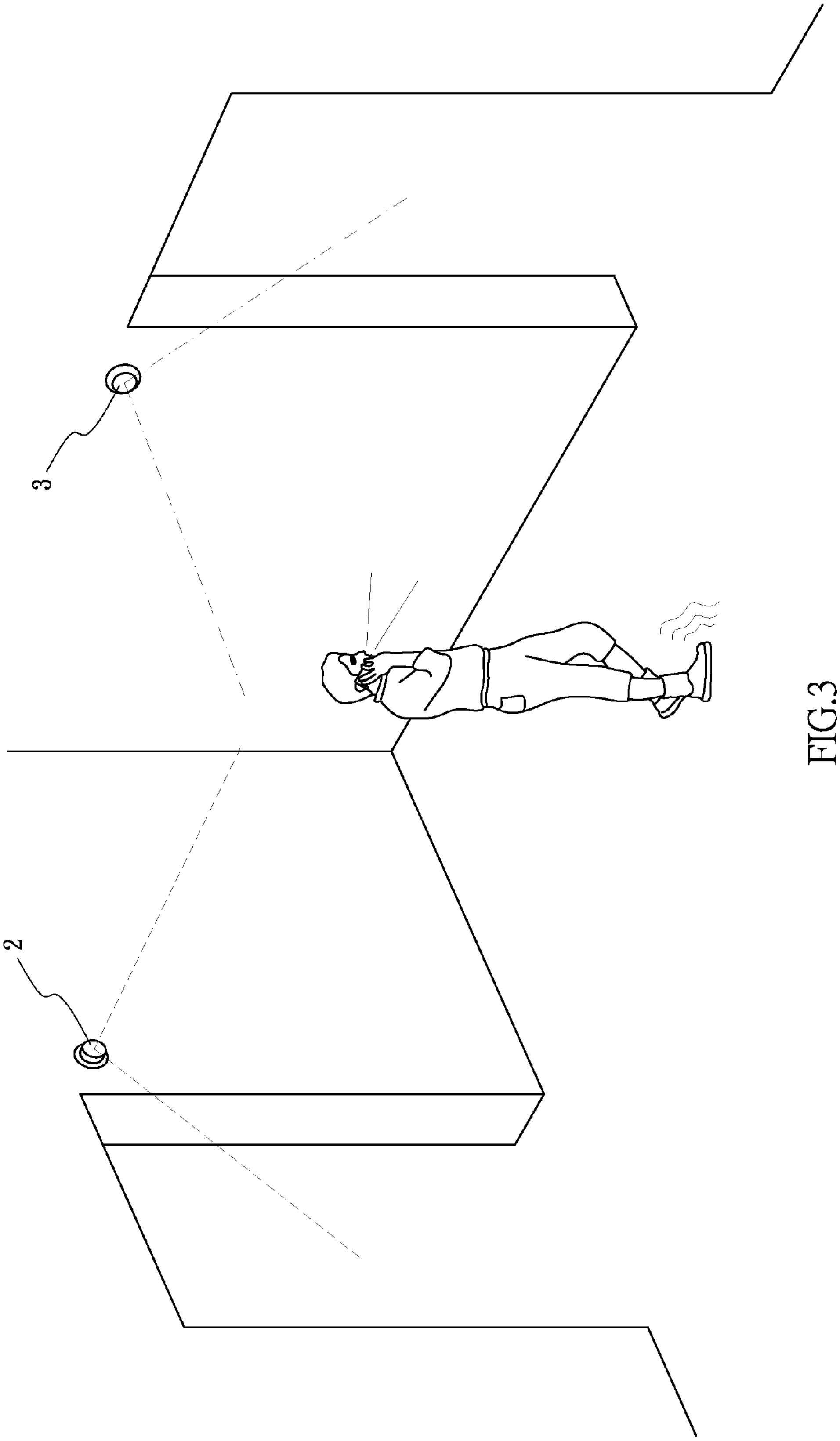
FIG. 3 illustrates that single home member is located in the house in which the home intellectual positioning system of the present invention is disposed.

Referring to FIGS. 1-3, a home intellectual positioning system in accordance with a preferred embodiment of the present invention comprises a power supply 1, a sound sensor 2, a thermal sensor 3, an identification unit 4 and an intellectual processor 5. The power supply 1 could be mains supply or battery, which is provided electric power for above devices.

The home intellectual positioning system is disposed in a house for identifying a plurality of home members in the house. The sound sensor 2 in the house is provided for detecting and tracking a sonic wave of any one home member and to generate a sonic wave value. The thermal sensor 3 is provided for detecting and tracking a body temperature of the home member and to generate a body temperature value. The identification unit 4 is provided for storing sonic wave information and body temperature information of home members.

With reference to FIGS. 1-2, the intellectual processor 5 is interconnected to the identification unit 4. The intellectual processor 5 is configured to read the sonic wave value from the sound sensor 2 and the body temperature value from the thermal sensor 3, and further to compare the sonic wave value of the sound sensor 2 with the sonic wave information of the identification unit 4 and the body temperature value of the thermal sensor 3 with the body temperature information of the identification unit 4 to identify which home member stays in the house, as shown in FIG. 3.

Figure 4:
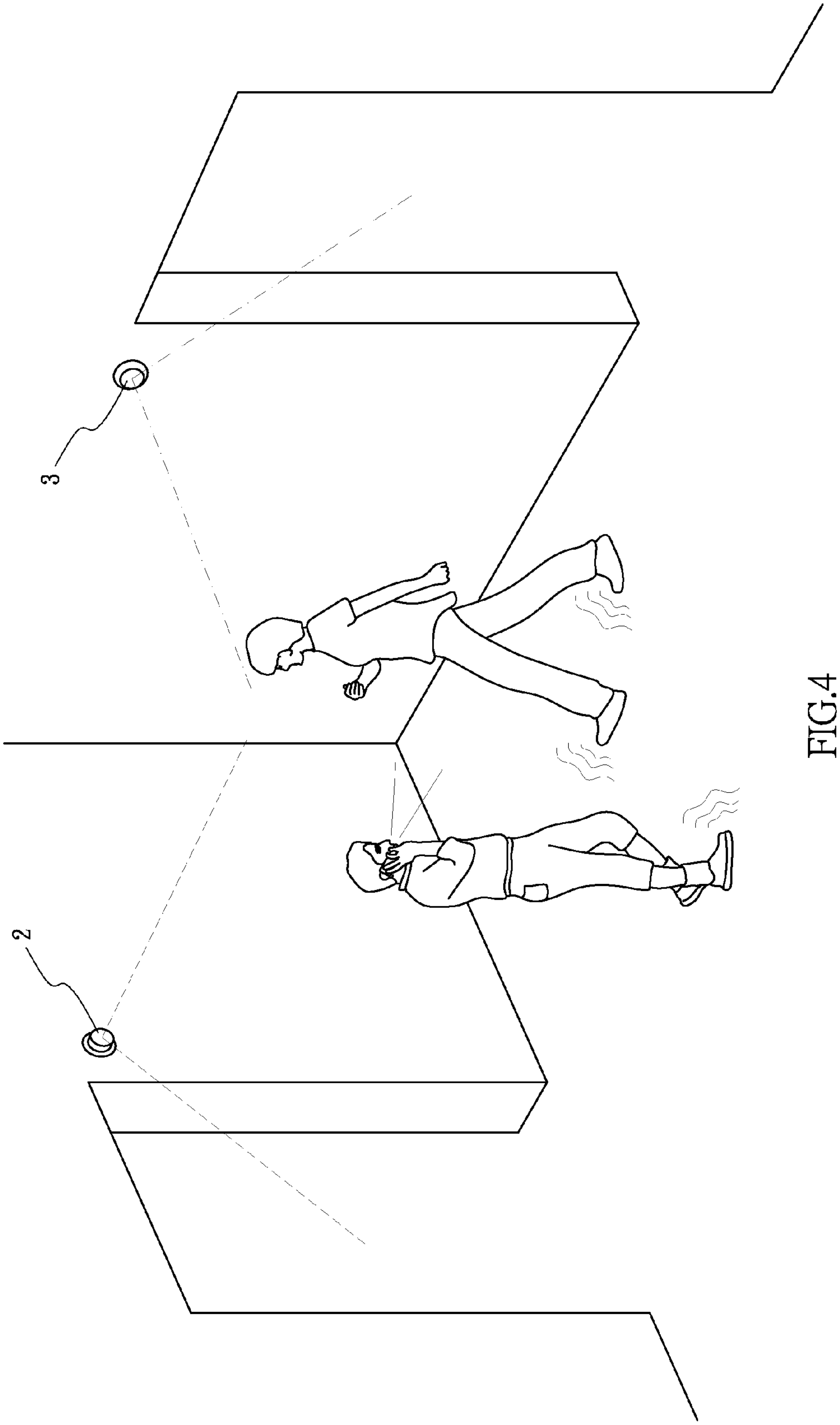
FIGS. 4-5 illustrate that two home members are occupied in the house shown in FIG. 3.
Figure 5:
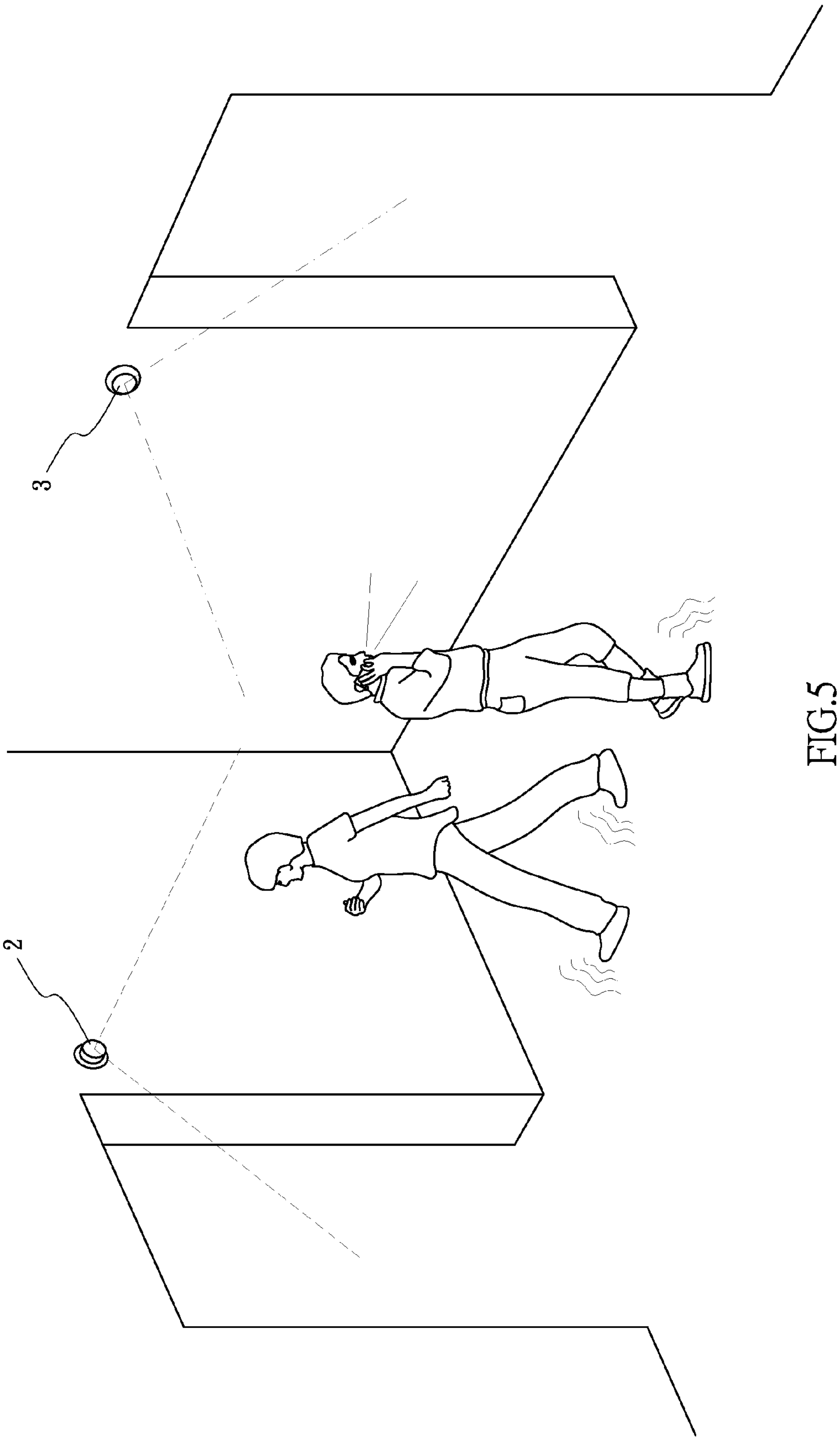

Referring to FIGS. 4-5, there are two home members in the house while the sound sensor 2 and the thermal sensor 3 are provided to detect and track sonic waves and body temperatures of the two home members and to generate two sonic wave values and two body temperature values. The intellectual processor 5 compares each sonic wave value of the respective home member with the sonic wave information of the identification unit 4 to generate two sound identification values, and also compares each body temperature value of the respective home member with the body temperature information of the identification unit 4 to generate two body temperature identification values. The two sound identification values and the two body temperature identification values could be cross compared to be double checked. Therefore, the home intellectual positioning system could exactly track every home member in the house.

Furthermore, the identification unit 4 could further store ID information of each home member and environmental information. The ID information includes name, sex, age, height, body conformation, and medical record of each home member. The environmental information includes indoor temperature, which is provided the intellectual processor 5 with error correction.

Specifically, the sonic wave information includes sounds of voice and sounds of walking step for every home member. Further, the body temperature information includes day and night body temperature information, and body temperature information in various seasons or emotions. The thermal sensor 3 could detect a body temperature distribution of every home member. Since every home member has their own body temperature distribution, the accuracy of body temperature identification is increased.

Although embodiments of this invention have been fully described with reference to the accompanying drawings, it is to be understood that various modifications can be made by those skilled in the art without departing from the scope of the invention as hereinafter claimed.

What is claimed is:

1. A home intellectual positioning system for use in a house, the system comprising:

a power supply;

a sound sensor for detecting and tracking a sonic wave of a home member to generate a sonic wave value;

a thermal sensor for detecting and tracking a body temperature of the home member to generate a body temperature value;

an identification unit for storing sonic wave information and body temperature information of a plurality of home members; and an intellectual processor interconnected to the power supply and the identification unit, and configured to read the sonic wave value from the sound sensor and the body temperature value from the thermal sensor, and to compare the sonic wave value of the sound sensor with the sonic wave information of the identification unit and the body temperature value of the thermal sensor with the body temperature information of the identification unit to identify which home member stays in the house.

2. The home intellectual positioning system as claimed in claim 1, wherein the sonic wave information includes sounds of voice and sounds of walking steps.

3. The home intellectual positioning system as claimed in claim 1, wherein the body temperature information includes day and night body temperature information.

4. The home intellectual positioning system as claimed in claim 1, wherein the body temperature information includes body temperature information in various seasons.

5. The home intellectual positioning system as claimed in claim 1, wherein the identification unit further stores ID information of each home member which includes name, sex, age, height, body conformation, and medical record.

6. The home intellectual positioning system as claimed in claim 5, wherein the identification unit further stores environmental information which is renewable; wherein the environmental information includes indoor temperature.

* * * * *